Jan. 12, 1943. C. A. KRANTZ 2,308,372
AUTOMATIC TIRE PRESSURE GAUGE OR SIGNAL
Filed April 29, 1942 2 Sheets-Sheet 1
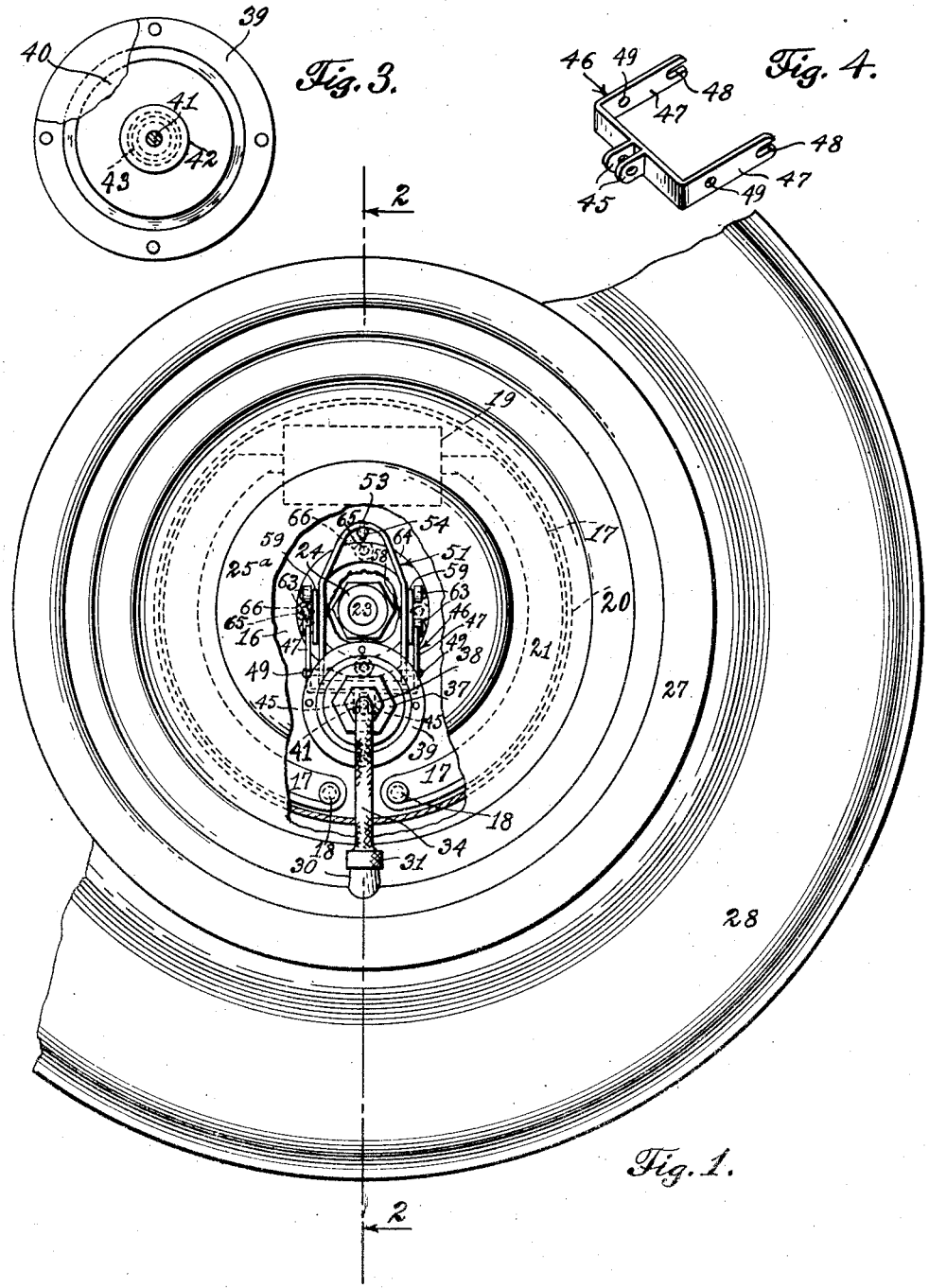
INVENTOR.
Carl Arvid Krantz

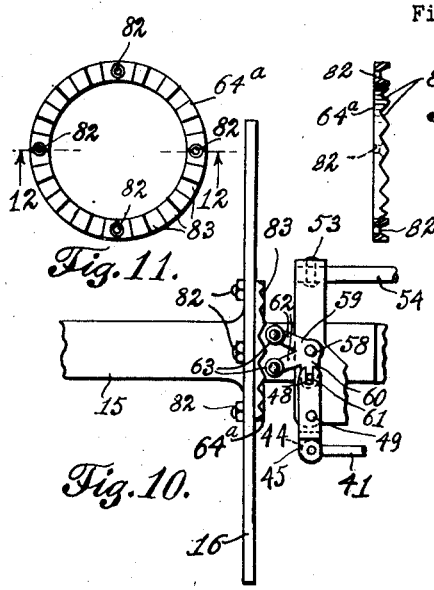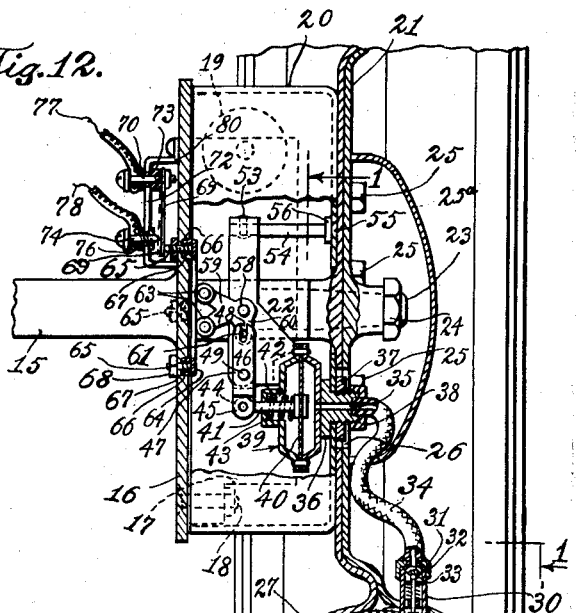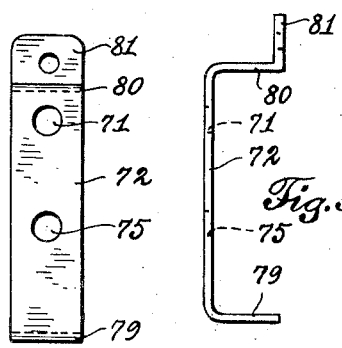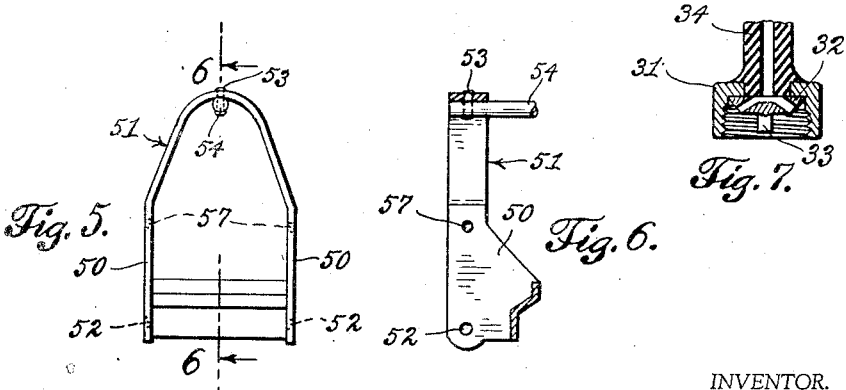

Patented Jan. 12, 1943

2,308,372

UNITED STATES PATENT OFFICE 2,308,372

AUTOMATIC TIRE PRESSURE GAUGE OR SIGNAL

Carl Arvid Krantz, Chicago, Ill.

Application April 29, 1942, Serial No. 440,915

8 Claims. (Cl. 200—58)

My invention relates to an automatic tire pressure gauge or signal adapted for fluid or air pressure containers, especially rotatable containers or the pneumatic tires of various vehicles, such as automobiles, aeroplanes and the like, or other purposes where a pneumatic tire or inflated chamber or the like is used, to warn of excessive or too little pressure.

The object thereof is to notify the driver or operator when the pressure is either higher or lower than a predetermined, prescribed or normal pressure such as that for which the tire is best adapted for efficient use and driving purposes.

Another object of the invention is to provide a simple, novel, and reliable signal operating means which by a discernible or perceptible signal, either visual, audible or otherwise, will when the air in any tire is either excessive or too low, which of course includes when a tire is deflated or flat from a leak, blowout or puncture, instantly warn the driver of such fact, so that the same can be corrected or repaired, and the proper pressure for the best preservation of the tires may be maintained and possible accident avoided.

A still further object is to provide a pressure indicator, gauge, or signal associated with the tires and housed in the brake drums of the wheels where it is protected in inclement weather, from dirt, ice and snow, or other foreign matter, whereby to give a signal at a pressure increase or decrease above or below a predetermined set or desirable pressure which is the best pressure for the tires to insure longest life and wear and greatest efficiency.

Another object of the invention is to provide a device which may be operated electrically or mechanically by the rotation of a wheel and which will permit convenient inflation or deflation of a tire.

Further objects and advantages will appear and be brought out more fully in the following specification, reference being had to the accompanying drawings, in which:

Fig. 1 is a side elevation of a wheel showing the automatic tire pressure gauge or signal applied thereto and taken on the line 1—1 of Fig. 2.

Fig. 2 is a sectional elevation taken diametrically on the line 2—2 of Fig. 1.

Fig. 3 is an enlarged sectional elevation of the pressure chamber partly broken away.

Fig. 4 is a perspective view of a forked lever for operating the signal device.

Fig. 5 is an edge elevation of a bracket for mounting certain of the operating parts.

Fig. 6 is a sectional view taken on the line 6—6 of Fig. 5.

Fig. 7 is an enlarged fragmentary sectional view showing a cap forming a hose connection for unseating the inflation valve of a tire.

Fig. 8 is an elevation of a bracket employed in connection with the device.

Fig. 9 is an edge view of the bracket shown in Fig. 8.

Fig. 10 is a fragmentary side elevation showing a modified form of signal producing means.

Fig. 11 is a face view of a corrugated ring employed in connection with the device shown in Fig. 10, and Fig. 12 is a sectional elevation of the ring shown in Fig. 11 taken on the line 12—12 thereof.

Referring to the drawings in detail and particularly Figs. 1 to 9, inclusive, in which the device is shown applied to an automobile wheel for notifying the driver when the pressure in any tire is above or below the desired pressure for which the device is set, 15 designates an axle or housing having the usual fixed or stationary flange or base plate 16 which mounts the internal expanding brake levers and shoes 17 shown spaced apart at their pivoted ends 18. The opposite or upper ends are adapted to be expanded by any suitable means such as a cam or hydraulic piston mounted within a pressure chamber or cylinder 19 as commonly used in hydraulic brakes and operated in the usual way well known in the art. The shoes are normally contracted and are operated from the brake pedal by the expanding means to apply the brakes to the internal surface of a brake drum 20, which is anchored to the wheel hub plates 21 of a wheel having rotatable bearing at 22 on the usual spindle 23 of a wheel and including retaining means 24 of any known character for retaining the wheel in position, which may include a plurality of stud bolts 25 usually five in number which are covered by a hub cap 25a. The discs of the hub plates of the wheel are provided with an eccentric opening 26. The rim is designated at 27 to take a tire 28 in which is disposed an inner tube 29 having the usual inflation valve 30 which projects through the rim and is adapted to close outwardly under and to maintain the pressure in the tire. This valve is unseated by a cap 31 having a spider 32 and a pin 33 which engages the stem of the valve when the internally threaded cap 31 is screwed on the valve casing. A tube 34 which may be of flexible rubber or other material communicates with the interior of the cap 31 and through the valve 30 with the interior of the tire and inner tube. Of course, the tube 34 may be of metal or formed on the outer face of the discs or plates 21 and at its opposite end communicates with a passage 35 in a hollow flanged stud or nipple 36 extending through the opening 26 and mounted in the radial wall of the brake drum 20 and held by a nut 37. A threaded cap 38 is shown attached to and coupling the adjacent inner end of the tube to the stud 36. Mounted on the inner flange of the stud or nipple 36 is a pressure control means having a casing or chamber 39, the piston or diaphragm 40 of which is retained between the two flanged sections thereof to be placed under pressure of the air within the tire through the tube 34 forming a passage to connect the inner tube to the chamber at one side of the diaphragm in the pressure control means or chamber 39. The diaphragm 40 is connected to an axial stem 41 at the opposite side anchored centrally to the diaphragm or piston and passing through a corresponding hole in a reduced hollow spring housing or extension 42 of the inner wall of the casing or housing of the chamber 39 which receives a calibrated coil spring 43 disposed around the stem between the end wall of the extension 42 and the diaphragm 40 at the anchoring means for said stem and designed to hold the diaphragm in a central or neutral position at normal pressure. The inner end of the stem is provided with an eye 44 which pivotally connects with two spaced jaws 45 of a forked lever 46 having two spaced arms 47 with slotted ends 48. These arms of the lever are pivoted at 49 to the opposite sides 50 of a bearing bracket 51 of substantially inverted V or U-shaped formation. As will be noted, the bearing bracket 51 has holes 52 for the pivots 49 and at the upper closed end or bight portion is provided with a screw, pin or rivet 53 to fixedly mount the same on a post 54 riveted or otherwise anchored as at 55 in connection with a flange 56 to the hub plates 21 so as to turn with the brake drum, plates and wheel. This post may be threaded for adjustment of the bearing bracket by means of nuts threaded on the post at each side of the bearing bracket or otherwise. The legs of the bearing bracket extend downwardly in spaced relation at each side of the spindle 23 of the axle 15 and these spaced sides are widened to form anchoring plates which may be welded, brazed or otherwise fastened to the inner wall or side of the casing or housing of the pressure chamber 39 so as to rotate with and within the brake drum 20. The legs or sides 50 of the bearing bracket 51 have holes 57 to pivotally mount at 58 forked or split bell-crank levers 59 having arms 60 with outstanding pins 61 which are engaged in the slots 48. The levers are bifurcated to form spaced divergent arms 62 on which rollers 63 are journaled.

A pressure ring 64 is mounted for axial movement on the flange 16 forming a bed plate or stationary support for the brake shoes and adapted for engagement by the rollers 63, as the latter rotate or revolve with the wheel and drum around the axis. This ring has lateral pins 65 extending inwardly through openings in the base plate or flange 16 through sockets 66 in the outer side of the flange which receive coil springs 67 around the pins between the end walls of the sockets and the ring 64 to normally press the ring outwardly. All of the pins 65 are engaged by nuts 68 to retain the ring in position and adjust the tension of the springs and thus the movement of the ring relative to the plate or flange 16 which is stationary with the axle. One of the pins projects inwardly beyond its nut to engage a movable or spring contact arm 69 mounted on a post 70 in an aperture 71 of a bracket 72 from which the spring arm or contact 69 is insulated by a bushing 73. A stationary contact is formed adjacent the free end of the movable contact 69 by a post 74 mounted in a hole 75 in the bracket 72 in spaced relation to the post 70 and insulated from the bracket by a bushing 76. Conductor wires 77 and 78 lead from these posts to a source of electrical energy such as the battery of the car or otherwise and any suitable signal device or gauge preferably positioned on the dash in front of the driver or elsewhere and constituting a discernible or perceptible signal either audible, visual or otherwise, for notifying or warning the driver of the condition of the air pressure in the inner tubes of the tires and particularly when the same is above or below a normal pressure which it is desired to maintain in any or all of the tubes and tires, and which constitutes a most suitable pressure at which the same are adapted to be maintained for best service and driving purposes. It is of course to be understood that the same equipment is provided on each tire or wheel, but that the device may be applied equally as well to any pressure container, especially one which is movable or rotatable like a tire, which it is desired to control. The brackets 72 have one end 79 bent against the anchoring plate or flange 16, and the other end 80 has an attaching portion 81 fastened to the flange.

In the operation of the device, with the valve 30 unseated by applying the cap 31, the diaphragm or piston 40 is placed under pressure of the air in the tire and as long as this pressure is normal the spring 43 maintains the diaphragm in a central or neutral position and the parts in the relation shown in Fig. 2 with the pivoted connections in vertical alignment. However, should the pressure be excessive, the diaphragm will be forced inwardly to compress the spring 43 and swing the lever 46 on its pivots 49 to move the slotted ends 48 of the arms 47 outwardly and thus move the lower rollers away from the ring 64 and the upper rollers inwardly to press against the ring and cause the pin 65 to move the spring contact arm 69 inwardly into engagement with the post 74 and close the circuit to the signal device. On the other hand, should the pressure in the tire be below normal or too low, the spring 43 will move the diaphragm 40 outwardly and throw the arms of the lever 46 in the opposite direction or inwardly to move the upper rollers outwardly away from the ring 64 and the lower rollers inwardly against the ring to similarly shift the movable contact 69 into engagement with the stationary contact formed by the post 74 to similarly operate the signal. As long as the pressure is normal, the signal will remain inoperative and the driver will know that the condition of the tires is correct or that they are inflated at the proper pressure. Obviously this mechanism may control any pressure container, especially one which revolves about an axis in the same manner as the tire on a vehicle wheel.

In Figs. 10, 11 and 12 of the drawings a slightly modified form of the device is shown in which all of the parts are the same as previously described except that a ring 64a is anchored firmly to the base or flange 16 as indicated at 82 by bolts, rivets or otherwise, and the outer, i. e. one face of the ring is corrugated as shown at 83 so that as the vehicle wheel revolves a signal will be given by the rollers moving over the corrugated surface when the pressure is above or below normal. Obviously the signal may be visual, audible, or otherwise, or may be in the form of a hydraulic gauge or other discernible or perceptible signal which may be readily observed and warn the driver or operator of the condition of the tire or pressure chamber and container so that deviation from normal pressure may be immediately corrected. Also, it is to be understood that while the inner tube of the tire may be readily inflated or deflated to the correct pressure through the valve 30 by disconnecting the tube 34 forming an air conduit between the same and the air tight expansion or pressure chamber, disconnection at this point may be obviated by providing a separate inflation valve. So long as the pressure remains normal and at the correct pressure for which the spring 43 is set to maintain the diaphragm or piston 40 in a central or neutral position, the signal will not be operated by the mechanical means under control of the air pressure to make or break the electrical contact and circuit, to register the tire pressure on the instrument board or panel of the automobile or otherwise. In addition to electrical means, the signal may be audible, visual or otherwise discernible but it is to be understood that the signal may be audible, such as by the sound of the ratchet-like action of the rollers moving over the teeth and notches of the corrugated surface 83 of the ring 64a, or by closing the electric circuit to a bell, buzzer or other audible signal or may be visual such as by closing the electric circuit to an electric bulb or other visual signal, or such signal may be otherwise discernible or perceptible such as by being subject to the sense of feeling or touch. In the purely mechanical signal, the electrical contact or switch and circuit is entirely eliminated, which permits the production of a more economical construction, but in either case the signal attracts the driver's attention so that proper correction or repair may be immediately made to avoid any accident or destructive effect.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. An automatic pressure indicator for pressure containers, including a movable pressure responsive device in communication with the container, a bracket supported by the container to rotate therewith, a lever pivoted on the bracket and connected to the pressure responsive device, a bell crank lever operatively connected to the first lever and a ring mounted against rotation and against which an arm of the bell crank lever is pressed in response to movement of the pressure responsive device.

2. An automatic indicator for rotatable pressure containers, comprising a pressure responsive device communicating with the container and moved by variations of pressure therein, a bearing bracket rotatable with the container, a forked lever pivoted on the bearing bracket and to said device, a bell crank lever pivoted on the bracket and operatively connected to the forked lever, said bell crank lever having a pair of arms, and a ring carried by a stationary part for engagement by one of said arms when the pressure rises or falls below a predetermined point.

3. A pressure gauge for tires of vehicles, including a pressure responsive device having communication with the tire and rotatable therewith, a forked lever pivoted to the bracket and pivotally connected to the pressure responsive device, said forked lever having slotted ends, bell crank levers pivoted from the bracket at the axis of rotation and having portions engaged in the slots, said bell crank levers having spaced arms on opposite sides of said axis, anti-friction members on said arms and a pressure ring mounted against rotation and engaged by the anti-friction members upon change in the pressure.

4. In an automatic pressure gauge or signal for vehicle tires, the combination with the wheel thereof, brake drum, stationary base plate comprising a post on the wheel of a tire to rotate with the same and the drum, a bracket supported on the post and spanning the wheel axle, a forked lever pivoted on the bracket at one side of the axis of rotation, a movable pressure responsive member communicating with the tire and normally held in a neutral position and connected to the forked lever, bell crank levers pivoted on the bracket at the axis of rotation and operatively connected to the fork lever, said bell crank lever having branching arms, rollers on said arms, and a ring mounted on the base plate against rotation and against which the rollers are pressed by a rise or fall in the pressure.

5. An automatic tire pressure gauge or signal for the tires of vehicles comprising a brake drum associated with the wheel of a tire, a diaphragm pressure chamber rotatable with the wheel and contained in the drum, said chamber being exposed on one side to the air pressure, a spring acting upon the opposite side of the diaphragm to hold it central at normal pressure, a forked lever movably mounted in the drum and connected to the diaphragm for rotation with the drum, a lever pivoted within the drum and operatively connected to the forked lever for movement when the pressure rises or falls relative to a predetermined point, and a ring carried by the back plate of the drum and having corrugations engageable by the second lever.

6. An automatic tire pressure gauge or signal for the tires of vehicles comprising a brake drum associated with the wheel of a tire, a diaphragm pressure chamber rotatable with the wheel and contained in the drum, said chamber being exposed on one side to the air pressure, a spring acting upon the opposite side of the diaphragm to hold it central at normal pressure, a forked lever movably mounted in the drum and connected to the diaphragm for rotation with the drum, a lever pivoted within the drum and operatively connected to the forked lever for movement when the pressure rises or falls relative to a predetermined point, said second lever having branching arms with anti-friction members disposed on opposite sides of the pivot axis thereof and the axis of rotation, a ring carried by a stationary part and engageable by said anti-friction members due to swinging of the second lever by the rise and fall of pressure communicated to the forked lever by movement of the diaphragm.

7. An automatic pressure indicator for the tires of vehicles comprising a brake drum associated with the wheel of a tire and having a stationary base plate, a diaphragm pressure chamber rotatable with the wheel and contained in the drum, said chamber being exposed on one side to the air pressure, a spring acting on the opposite side of the diaphragm to hold it in a central position at normal pressure, a forked lever movably mounted in the drum, a lever connected to the diaphragm and operatively connected to the forked lever to actuate the latter when the pressure rises or falls relative to a predetermined point, said forked lever being pivoted at the axis of rotation and having its arms extending on opposite sides thereof, a ring movably mounted on the base plate against rotation, switch contacts carried by the base plate and closed by movement of the ring, means for forcing the ring toward the arms of the forked lever and means on said arms for engaging the ring to press the latter when the pressure exceeds or falls below said predetermined point.

8. A pressure indicator for tires or the like comprising a stationary axis, a ring fixed thereto, levers pivoted on opposite sides of the axis of rotation of the tire and its wheel to rotate therewith and having forked arms with rollers adapted to engage the plate, a movable pressure responsive member communicaing with the tire and rotatable therewith and operative connections between said device and said levers to rock the latter in opposite positions upon increase and decrease in the pressure.

CARL ARVID KRANTZ.